United States Patent
Flowers et al.

(10) Patent No.: US 10,015,239 B1
(45) Date of Patent: Jul. 3, 2018

(54) SELF-ORGANIZING DISTRIBUTED COMPUTATION GRID

(71) Applicant: TrustPipe LLC, Healdsburg, CA (US)

(72) Inventors: John S. Flowers, San Francisco, CA (US); Martin Quiroga, Headsburg, CA (US)

(73) Assignee: EVENGX, LLC, San Francisco, CA (US)

( * ) Notice: Subject to any disclaimer, the term of this patent is extended or adjusted under 35 U.S.C. 154(b) by 148 days.

(21) Appl. No.: 15/235,035

(22) Filed: Aug. 11, 2016

Related U.S. Application Data

(60) Provisional application No. 62/204,399, filed on Aug. 12, 2015.

(51) Int. Cl.
  *G06F 15/16* (2006.01)
  *H04L 29/08* (2006.01)
  *H04L 12/751* (2013.01)
  *H04L 29/12* (2006.01)

(52) U.S. Cl.
  CPC .............. *H04L 67/10* (2013.01); *H04L 45/02* (2013.01); *H04L 61/1511* (2013.01); *H04L 61/6022* (2013.01)

(58) Field of Classification Search
  CPC ..... H04L 67/10; H04L 45/02; H04L 61/6022; H04L 61/1511
  USPC ......... 709/203, 217, 242, 243; 717/168, 171
  See application file for complete search history.

(56) References Cited

U.S. PATENT DOCUMENTS

| | | | |
|---|---|---|---|
| 8,189,577 B2 * | 5/2012 | Vaswani | H04L 41/0806 370/389 |
| 8,347,391 B1 | 1/2013 | Flowers | |
| 8,856,324 B2 | 10/2014 | Flowers et al. | |
| 9,077,760 B2 * | 7/2015 | McKeown | H04L 12/2874 |
| 2009/0003232 A1 * | 1/2009 | Vaswani | H04L 45/00 370/252 |
| 2009/0070441 A1 * | 3/2009 | Karlov | H04L 41/0886 709/220 |
| 2010/0061350 A1 * | 3/2010 | Flammer, III | H04L 1/1628 370/338 |
| 2013/0304887 A1 * | 11/2013 | Cherian | H04W 8/26 709/223 |
| 2014/0241267 A1 * | 8/2014 | Cherian | H04L 61/103 370/329 |

* cited by examiner

*Primary Examiner* — Michael Y Won
(74) *Attorney, Agent, or Firm* — Dentons US LLP

(57) ABSTRACT

A self-organizing distributed network architecture is described. An example method includes, by a network node, sending via a network gateway node a DNS lookup request to a DNS service. The DNS lookup request comprises a string that at least includes a MAC address of the network gateway node that is used by the DNS service to identify a network address for the network node to access the network service of interest. The method further includes receiving via the network gateway node a DNS lookup response from the DNS service. The DNS lookup response comprises the network address for the network node to access the network service of interest. The method further includes accessing the network service of interest from another network node in the network system that is addressable by the received network address.

8 Claims, 4 Drawing Sheets

SELF-ORGANIZING DISTRIBUTED COMPUTATION GRID

CROSS-REFERENCE TO RELATED APPLICATIONS

This application claims priority to U.S. Provisional Patent Application Ser. No. 62/204,399, "SELF-ORGANIZING DISTRIBUTED COMPUTATION GRID," filed on Aug. 12, 2016. The content of this application is hereby incorporated by reference for all purposes.

BACKGROUND

1. Field

The present disclosure relates generally to a distributed networking architecture having self-organizing nodes.

2. Description of Related Art

Typical computer networks include multiple network nodes that each access web-based services in order to obtain content updates, push status reports, etc. In large deployment scenarios such an implementation may be costly and inefficient at least in terms of computing resource allocation and/or usage.

SUMMARY

The present disclosure provides a distributed networking architecture useful in large-scale software deployments. For example, the architecture is distributed (e.g., non-centralized) to ensure no single point of failure. As another example, the architecture includes self-organizing nodes that form a self-organized content distribution network, to minimize bandwidth utilization and prevent overloading a single point of distribution. As another example, networked nodes in the architecture support data push and/or pull operations (or both).

It is contemplated that the various features or aspects of the present disclosure may be implemented in or as or by at least one of a system, a method, a device, and a computer-program-product according to the specification and drawings. In some embodiments, DNS server services are leveraged non-conventionally to support networks having the contemplated architectures.

For example, a first method for accessing a network service of interest in a network system is contemplated. One or more steps of the method may be performed or implemented by a network node. A step may include sending via a network gateway node a DNS (Domain Name Service) lookup request to a DNS service. In this example, the DNS lookup request may comprise a string that at least includes a MAC (Media Access Control) address of the network gateway node. The string may be used by the DNS service to identify a network address for the network node to access the network service of interest. Another step may include receiving via the network gateway node a DNS lookup response from the DNS service. In this example, the DNS lookup response may comprise the network address for the network node to access the network service of interest. Another step may include accessing the network service of interest from another network node in the network system that is addressable by the received network address.

As another example, a second method for accessing a network service of interest in a network system is contemplated. One or more steps of the method may be performed or implemented by a network node. A step may include sending via a network gateway node a DNS lookup request to a DNS service. In this example, the DNS lookup request may comprise a string that at least includes a MAC address of the network gateway node and a particular parameter both that are used by the DNS service to identify a number of distinct network addresses for the network node to access the network service of interest. Another step may include receiving a DNS lookup response from the DNS service. In this example, the DNS lookup response comprises an integer value that represents the number of distinct network addresses for the network node to access the network service of interest. Another step may include randomly selecting a non-zero integer value that is less than or equal to the integer value. Another step may include sending a second DNS lookup request to the DNS service via the network gateway node. In this example, the second DNS lookup request may comprise a second string that at least includes a MAC address of the network gateway node and the non-zero integer value both that are used by the DNS service to identify a particular network address for the network node to access the network service of interest. Another step may include accessing the network service of interest from another network node in the network system that is addressable by the received particular network address.

Additionally, or alternatively, in at least one of the first method and the second method, the string of the DNS lookup request may comprise a DNS field indicator of address record type that is associated with the MAC address of the network gateway node.

Additionally, or alternatively, in at least one of the first method and the second method, the string of the DNS lookup request may further comprise a MAC address of the network node.

Additionally, or alternatively, in at least the second method, the string of the DNS lookup request may comprise a DNS field indicator of text record type that is associated with the parameter.

As another example, a first method for resolving a request for access to a network service of interest in a network system is contemplated. One or more steps of the method may be performed or implemented by a DNS service. A step may include receiving via a network gateway node a DNS lookup request from a network node. In this example, the DNS lookup request may comprise a string that at least includes a MAC address of the network gateway node. Another step may include, in response to receiving the DNS lookup request, identifying a network address for the network node to access the network service of interest in the network system based upon the MAC address of the network gateway node. Another step may include sending a DNS lookup response to the network gateway node. In this example, the DNS lookup response may comprise the network address for the network node to access the network service of interest in the network system.

As another example, a first method for resolving a request for access to a network service of interest in a network system is contemplated. One or more steps of the method may be performed or implemented by a DNS service. A step may include receiving via a network gateway node a DNS lookup request from a network node. In this example, the DNS lookup request may comprise a string that at least includes a MAC address of the network gateway node and a parameter that represents a call for a number of distinct network addresses available for the network node to access the network service of interest. Another step may include, in response to receiving the DNS lookup request, identifying an integer value that represents the number of distinct network addresses available for the network node to access the network service of interest. Another step may include sending a DNS lookup response to the network gateway node. In this example, the DNS lookup response may comprise the integer value that represents the number of distinct network addresses available for the network node to access the network service of interest. Another step may include receiving via the network gateway node a second DNS lookup request from the network node. In this example, the second DNS lookup request may comprise a second string that at least includes a MAC address of the network gateway node and a non-zero integer value that is less than or equal to the integer value. Another step may include, in response to receiving the second DNS lookup request, identifying a network address for the network node to access the network service of interest based upon the MAC address of the network gateway node and the non-zero integer value. Another step may include sending a second DNS lookup response to the network gateway node, wherein the second DNS lookup response comprises the network address for the network node to access the network service of interest.

Additionally, or alternatively, at least one of the first method and the second method may include a step of accessing a DNS record of address record type to identify the network address for the network node to access the network service of interest.

Additionally, or alternatively, in at least one of the first method and the second method, the string of the DNS lookup request may further comprise a MAC address of the network node.

Additionally, or alternatively, at least one of the first method and the second method may include a step of accessing a DNS record of text record type to identify the integer value that represents the number of distinct network addresses available for the network node to access the network service of interest.

DETAILED DESCRIPTION

1. Introduction

Typical IP-based networks include multiple network nodes that each, separately, access web-based services in order to obtain content updates, push status reports, etc. In large deployment scenarios such an implementation may be costly and inefficient at least in terms of computing resource allocation and/or usage. For example, in an enterprise software deployment scenario, each one of a large number of network nodes may access a web-based update service (e.g., update.companyname.com) to negotiate a download of an update for a particular piece of software. One of skill in the art will appreciate that such an implementation may be quite costly and inefficient in terms of bandwidth usage, and that such an implementation may result in single points of failure, for example. Thus, to address such and other issues associated with typical IP-based networks, a self-organizing distributed computation grid is contemplated whereby particular network nodes that access a network(s) via a particular gateway node are logically grouped based on that particular gateway node, in or as a zone. A particular network node in a particular zone may then serve as a service(s) provider proxy whereby other network nodes (not necessarily in the same zone) may, for example, pull an update from that particular network node. Advantageously, a cost and efficiency savings may be realized in that overall a smaller group or number of network nodes would communicate directly with a service provider. This paradigm stands in contrast with typical web-based update services. The self-organizing distributed computation grid of the present disclosure is dynamic in that the role played by any particular network node (e.g., client or server) may be defined on-the-fly as network nodes come online or drop from a network. Although not so limited, an appreciation of the various aspects of the present disclosure may be gained from the following description in connection with the drawings.

Figure 1:
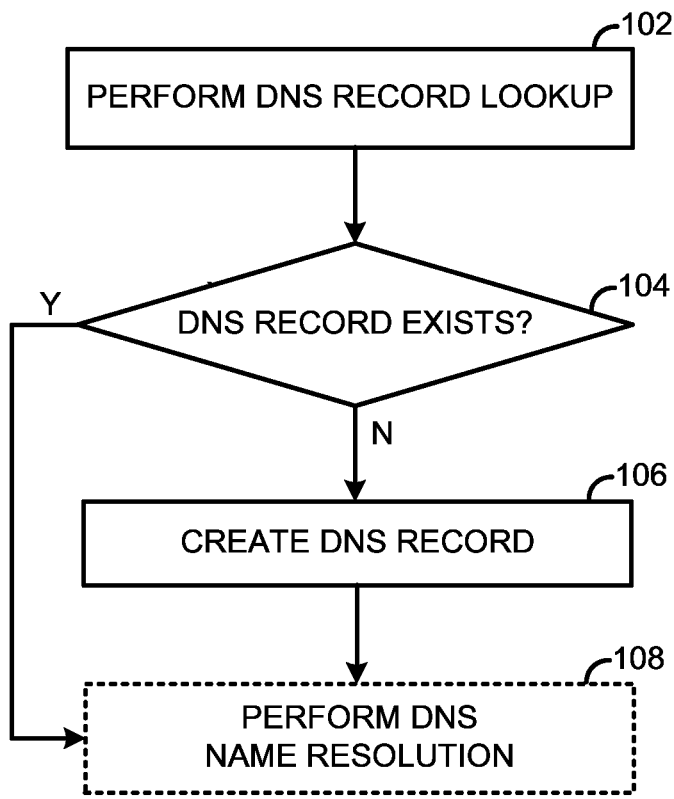
FIG. 1 depicts a first process according to the principles of the disclosure.

For instance, FIG. 1 depicts a first process 100 according to the principles of the disclosure. More specifically, FIG. 1 illustrates an example method for leveraging a DNS server to account for online status of a particular network node in a network system. In practice, the network node may query the DNS server to perform (step 102) a record lookup so that the DNS server may determine (step 104) whether or not a record of the network node exists at the DNS server. One of skill in the art will appreciate that TTL (Time-to-Live) rules or logic, for example, may dictate that an existing record of the network node be purged from or by the DNS server following expiration of a predetermined time period, and so for this reason a record of the network node may not necessarily exist at the DNS server. The DNS server may create (step 106) such a record when it is determined that the same does not exist at the DNS server, to account for online status of the particular network node in the network system. Such an implementation may be beneficial or advantageous in many respects.

For example, it is contemplated that the mentioned query may include or comprise a string that uniquely identifies the particular network node. For example, the string may have a format " . . . ParameterA.ParameterB . . . " whereby "ParameterA" may correspond to the MAC address of the network node, and "ParameterB" may correspond to the MAC address of a particular gateway node utilized by the network node to access the DNS server. An existing (possibly newly created) record of the network node at the DNS server may include a textual entry that corresponds to the string (i.e., " . . . ParameterA.ParameterB . . . "). In practice, the DNS server may then perform (step 108) DNS name resolution for the network node (when requested, indicated by intermittent line in FIG. 1), whereby a DNS lookup request may at least comprise a string that includes a parameter that corresponds to a MAC address of a network gateway.

Figure 2:
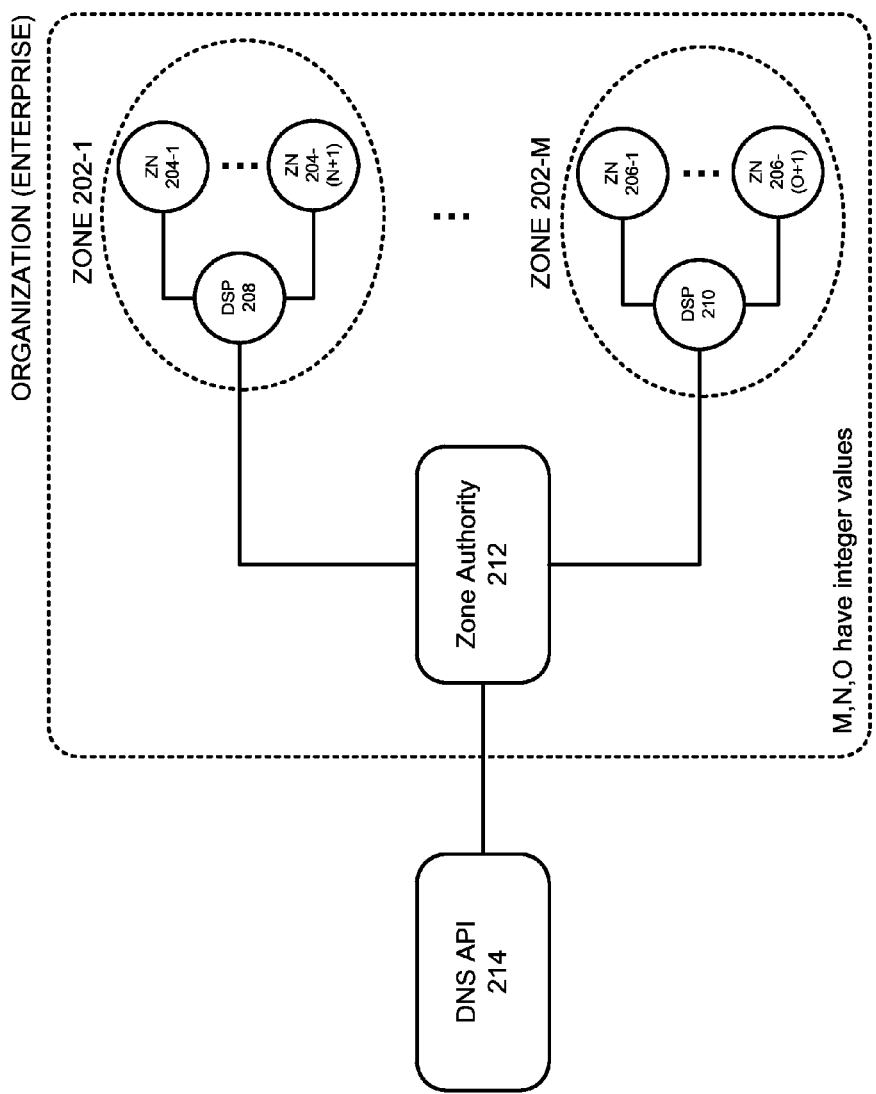
FIG. 2 depicts a first diagram according to the principles of the disclosure.
Figure 3:
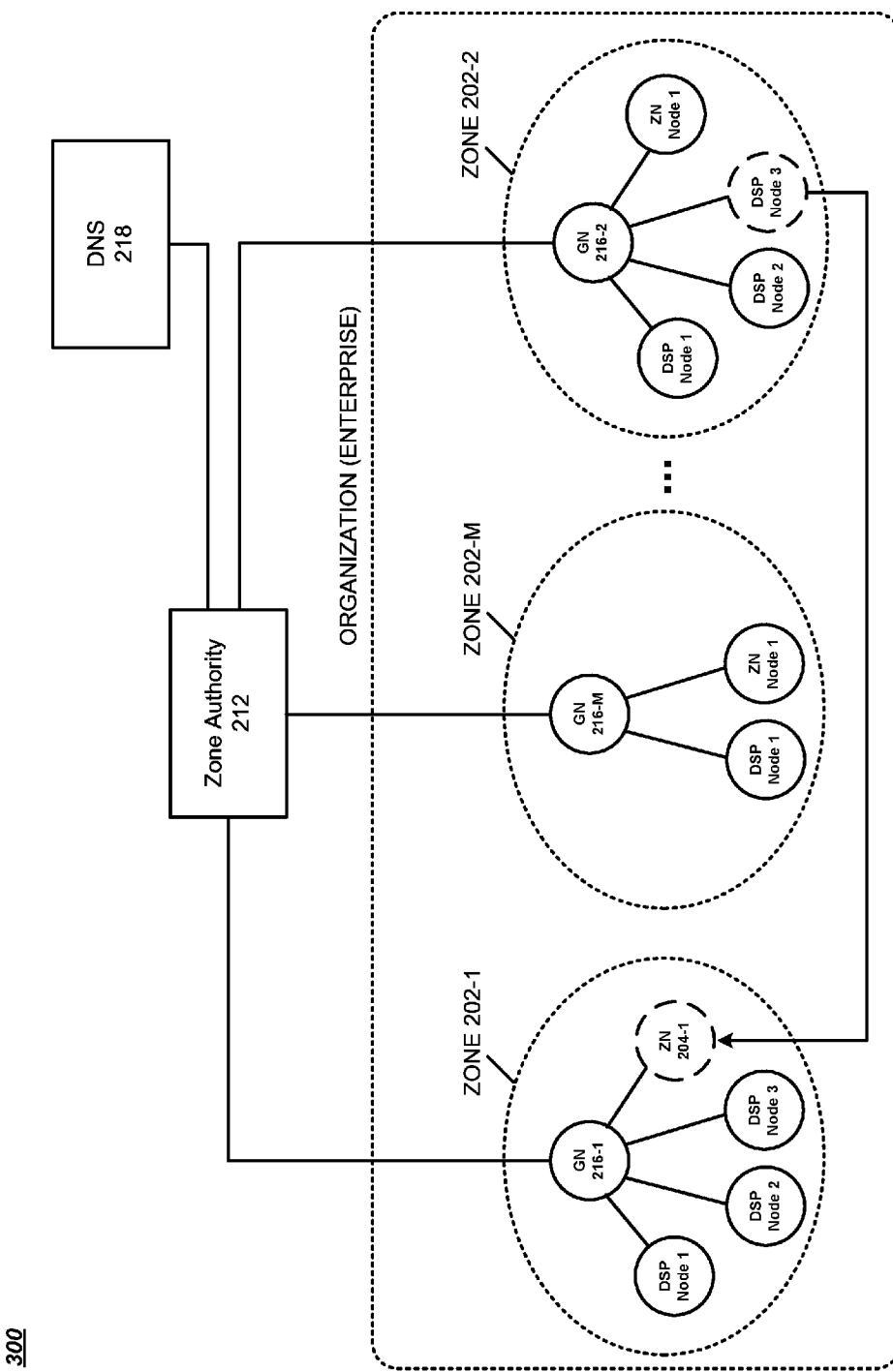
FIG. 3 depicts a second diagram according to the principles of the disclosure.

Additionally, once a particular network node has been registered on the DNS server, that network node may seek access to an authorization service to determine if the network node is authorized to execute particular code. In this example, the network node may query the DNS server whereby the ParameterA (of the above-example) is a string that specifies that access to the authorization service is being sought. An example format of such a string is "auth.service.<gateway_mac>.trustpipe.software.com" where <gateway_mac> represents the MAC address of the gateway to which the network node is connected. Notably, by embedding the gateway MAC address in the string as shown, the DNS server may point the network node to an authorization service proxy that exists in a zone that includes the network node, instead of a web-based service that services an arbitrarily large number of network nodes irrespective of a logical grouping of those nodes. As discussed in further detail below, a zone corresponds to a logical grouping of network nodes that all share a common gateway MAC address. FIGS. 2-3 together with corresponding description provide, among other things, examples of DNS name resolution utilizing the MAC address of a network gateway in accordance with the principles of the present disclosure.

For instance, FIG. 2 depicts a first diagram 200 according to the principles of the disclosure. More specifically, FIG. 2 illustrates an example software architecture of a self-organizing distributed computational grid that leverages DNS for service lookups. FIG. 3 depicts a second diagram 300 according to the principles of the disclosure. More specifically, FIG. 3 illustrates an example hardware architecture of a self-organizing distributed computational grid that leverages DNS for service lookups. It is contemplated that the features or aspects of the present disclosure may be implemented in or as any combination of software, firmware, and hardware. Although not so limited, examples of components of FIG. 2 and FIG. 3 include: Zones (e.g., Zone 202-1, . . . , Zone 202-M); Zone Nodes (e.g., ZN 204-1, ZN 206-1); Dynamic Service Proxies (e.g., DSP 208, DSP 210); Zone Authority (e.g., ZA 212); at least one DNS API (e.g., DNS API 214) provided by a DNS server (e.g., server 218); and Gateway Nodes (e.g., GN 216-1, . . . , GN 216-M).

In FIG. 2, zone nodes of a particular zone are depicted as connected to a particular dynamic service proxy to indicate that those zone nodes may access one or more services provided by a corresponding dynamic service proxy. An example of a service provided by a dynamic service proxy may include a license service, an update service, or a reporting service. Other or additional connections are possible. For example, in FIG. 3, zone nodes of a particular zone are depicted as connected to a particular gateway node to indicate that those zone nodes may access a DNS server via the gateway node to leverages DNS service lookups in a manner as described throughout.

2. Overview

Zones in the context of the present disclosure are self-organized collections of nodes that coordinate content updates and report aggregation. Zones are organized by their network visibility, and nodes that are connected to the same gateway MAC address are logically grouped together. This promotes network proximity which is beneficial for minimizing bandwidth usage when transmitting data. The nodes and service providers of a particular zone share the same base zone address. An example base zone address is "20-c9-d0-45-49-97.<root zone>" wherein the parameter "<root zone>"="trustpipe.companyname.com." Other examples are also possible.

Zone nodes in the context of the present disclosure leverage services in order to execute a particular piece or portion of software according to its intended purpose. Software for detecting and mitigating digital security threats, such as those described in U.S. Pat. No. 8,347,391, titled "System and Method for Detecting Network Activity of Interest," are examples of such software. In some examples, a zone node leverages an update service for software updates. In some examples, the update service is provided by another network node in the same zone, meaning that the two network nodes are both connected to the same network gateway.

A zone node identifies itself using an address having the format: "<localhost_interface_mac>.<gateway_mac>.<root zone>." In other words, the MAC address of a particular network interface on the node (e.g., localhost_interface_mac), and the MAC address of a connected network gateway (e.g., gateway_mac), may each be appended to a base zone address (e.g., root zone) to generate an identifier that uniquely identifies or specifies the particular zone node while that zone node is a connected to a network behind the particular network gateway. An example of such an identifier is "12-c4-36-48-c5-bc.20-c9-d0-45-49-97.trustpipe.companyname.com." Other examples are also possible.

3. Zone Nodes (ZNs)

It is contemplated that upon startup, each zone node comes online and checks for an existing entry of its own identifier in DNS. If one (own identifier) is present in DNS then the zone node will communicate with its upstream licensing proxy. If not, then the zone node will register and obtain a license lease from a zone authority (e.g., manager). To register with a zone authority, nodes check-in with their self-generated identifiers of the format: "<interface_mac>.<gateway_mac>.<root zone>." If the zone address is not present in DNS, then the zone authority creates a sub-zone and designates all requisite dynamic service proxies.

In some examples, connectivity with one or more services may enable a particular installed software to function according to its intended purpose. Although not so limited, examples of such services include:

A. Authorization Service

The particular installed software may negotiate with a license or authorization service for accounting purposes. An authorization service proxy in the context of the present disclosure may receive heartbeat check-ins from other active nodes in a particular zone. Periodic aggregate reports of this activity may be pushed to the zone authority for accounting purposes.

B. Update Service

The particular installed software may negotiate with an update service for new versions of the subject software. In some examples, the update service provides newer versions of the software. In some examples, the update service provides newer versions of software components, such as meta-expressions for detecting network security threats. Other examples are also possible. An update service proxy in the context of the present disclosure may receive check-ins for a most current zone software version via DNS "A" record lookup, whereby a lookup address may have the format: "update.service.<gateway_mac>.<root zone>." Other examples are also possible.

C. Reporting Service

The particular installed software may negotiate with a reporting service to report or provide an account of a detected event. This may include a report on a detected network activity of interest. U.S. Pat. No. 8,347,391 includes a description of network activities of interest consistent with the meaning of the term or phrase "network activity of interest" as used in the context of the present disclosure. A reporting service proxy in the context of the present disclosure may collect aggregate report data from zone nodes, and forward that data to a zone authority for generating site-wide reports, or pushing to a SIEM (Security Information and Event Management) system for example. A lookup address may have the format "report.service.<gateway_mac>.<root zone>." Other examples are also possible.

4. Dynamic Service Proxies (DSPs)

At least one of the example above-mentioned services (i.e., license service, update service, or reporting service) may be available in a particular zone through dynamic service proxies. Dynamic service proxies in the context of the present disclosure are comprised of zone nodes that are selected for the task of running a proxy server process. Although a single DSP is shown in each zone in FIG. 2, multiple DSPs may be present (see e.g., FIG. 3), whereby each DSP may serve as a services proxy for one or more particular service. For example, available DSP nodes may be arranged in a round-robin load pool to ensure service proxy high-availability, through load distribution and redundancy. Dynamic assignment to load pools is organized by a zone authority. In another example, nodes are made aware of the existence of multiple available DSPs, and a particular DSP node is selected randomly form the pool of available DSPs. Once a node is assigned into a load pool it (the node) starts or instantiates a particular service proxy server process to accept requests from other zone nodes. It is contemplated that load pool size may be determined dynamically by a zone authority, depending on a number of active zone nodes. This (integer) value may be published via DNS "TXT" (text) record entry, such as "002" for example. It is further contemplated that load pool membership may be designated by a DNS "A" (address) record entry of the format: "<integer>.<service_name>.<gateway_mac>.<root zone>." An example of such record entry is "002.auth.service.20-c9-d0-45-49-97.companyname.com." Other examples are possible.

In some examples, zone nodes load-distribute across the nodes from the load pool through an algorithm such as: (a) query for load pool size, which may be available through DNS TXT record lookup at an address "size.<service_name>.<gateway_mac>.<root zone>" (such as, e.g., "size.auth.service.20-c9-d0-45-49-97.trustpipe.companyname.com"); (b) randomly select an integer up to the load pool size, and use that integer to build a target node address (such as, e.g., "001.auth.service.20-c9-d0-45-49-97.trustpipe.companyname.com"); (c) if the target node is unreachable, contact zone authority to notify of node absence, and branch back to (b). Other algorithms are also possible.

5. Zone Authority

A zone authority or manager in the context of the present disclosure may be responsible for organizing zone topology. For example, assume the node as shown in intermittent line in zone 202-2 in FIG. 3 disconnects from gateway node 216-2 and then connects with gateway node 216-1 in zone 202-1. In this example, zone authority 212 may detect the (dis)connection and assign the newly connected node in zone 202-1 as zone node 204-1 (see FIG. 2). Zone node 204-1 may now be considered a client node that leverages services supplied by each one of the dynamic service proxy nodes in zone 202-1 (as opposed to a server node that provides services to zone nodes when zone node 204-1 was online within zone 202-2). In this way, the self-organizing distributed computation grid of the present disclosure is dynamic in that the role played by any particular network node (e.g., client or server) may be defined on-the-fly as network nodes come online or drop from a network.

6. Gateway Nodes

As may be understood by one of skill in the art, a gateway node in the context of the present disclosure may include a router device or gateway device.

7. Benefits/Advantages

One of skill in the art will appreciate that the architecture shown and described in connection with at least FIG. 2 and FIG. 3 supports large-scale deployments and provides a mechanism for the distribution of updates and configuration, license check-ins, and the aggregation of report data, and satisfies at least the following criteria:

A. Redundancy

The distributed, non-centralized architecture ensures no single point of failure.

B. Load-Balance

The self-organized content distribution network minimizes bandwidth utilization and prevents overloading a single point of distribution. Proximity awareness is realized so that nodes may push/pull data from a nearby neighbor.

C. Push/Pull Operations

The self-organized content distribution network supports both data push and pull operations. Pull operations may be leveraged for updates, and may be carried out at a predefined time intervals, for example. Push operations may be leveraged for a feedback loop that enables deployments to adapt to previously unseen, emergent threats. U.S. Pat. No. 8,856,324, the entirety of which is hereby incorporated by reference, includes a description of feedback loop consistent with the meaning of the term or phrase "feedback loop" as used in the context of the present disclosure.

D. Extensibility/Scalability

The self-organized content distribution network is optimized for enterprise deployments with potentially millions of nodes, and is extensible in that software/firmware (and/or hardware) modifications may be made according to implementation-specific details or requirements.

E. Interoperability/Agnosticism

The features or aspects of the present disclosure (e.g., software/firmware) may be seamlessly integrated with existing systems or devices. Additionally, while the features or aspects of the present disclosure are discussed as implemented through or via DNS, it will be appreciated by one of skill in the art that the present disclosure is not so limited. For example, it is contemplated that the elastic zone protocol of the present disclosure may be implemented through any number of services besides DNS, such as HTTP REST for instance. Further, implementation-specific details or requirements may evolve as technology evolves.

8. Example DNS Table

Table 1 below shows an example of a DNS table that lists a plurality of host/domain names whereby an "A" type DNS address record is utilized to map host/domain names to a corresponding IP address. For example, IP address "192.168.0.1" is mapped to host/domain name "gateway_MAC.trustpipe.software.com." As another example, IP address "192.168.0.3" is mapped to host/domain name "remotenode1_MAC.gateway_MAC.trustpipe.software.com." In this example, the host at IP address "192.168.0.3" is one of two service providers that provide authentication services (indicated by bold type in Table 1). This is indicated by the TXT type DNS text record associated with host/domain name "size.auth.service.trustpipe.software.com." In practice, the node at IP address "192.168.0.2," for example, may learn that there are two service providers available for authorization purposes and then randomly select a particular one of the two service providers in a manner as discussed above in at least section 4.

TABLE 1

| Host/Domain Name | A Record | TXT Record |
|---|---|---|
| gateway_MAC.trustpipe.software.com | 192.168.0.1 | |
| localhost_MAC.gateway_MAC.trustpipe.software.com | 192.168.0.2 | |
| remotenode1_MAC.gateway_MAC.trustpipe.software.com | 192.168.0.3 | |
| remotenode2_MAC.gateway_MAC.trustpipe.software.com | 192.168.0.4 | |
| remotenode3_MAC.gateway_MAC.trustpipe.software.com | 192.168.0.5 | |
| size.auth.service.trustpipe.software.com | | 2 |
| 001.auth.service.trustpipe.software.com | 192.168.0.3 | |
| 002.auth.service.trustpipe.software.com | 192.168.0.4 | |
| size.update.service.trustpipe.software.com | | 1 |
| 001.update.service.trustpipe.software.com | 192.168.0.5 | |
| size.report.service.trustpipe.software.com | | 1 |
| 001.report.service.trustpipe.software.com | 192.168.0.2 | |

9. Computing System

Figure 4:
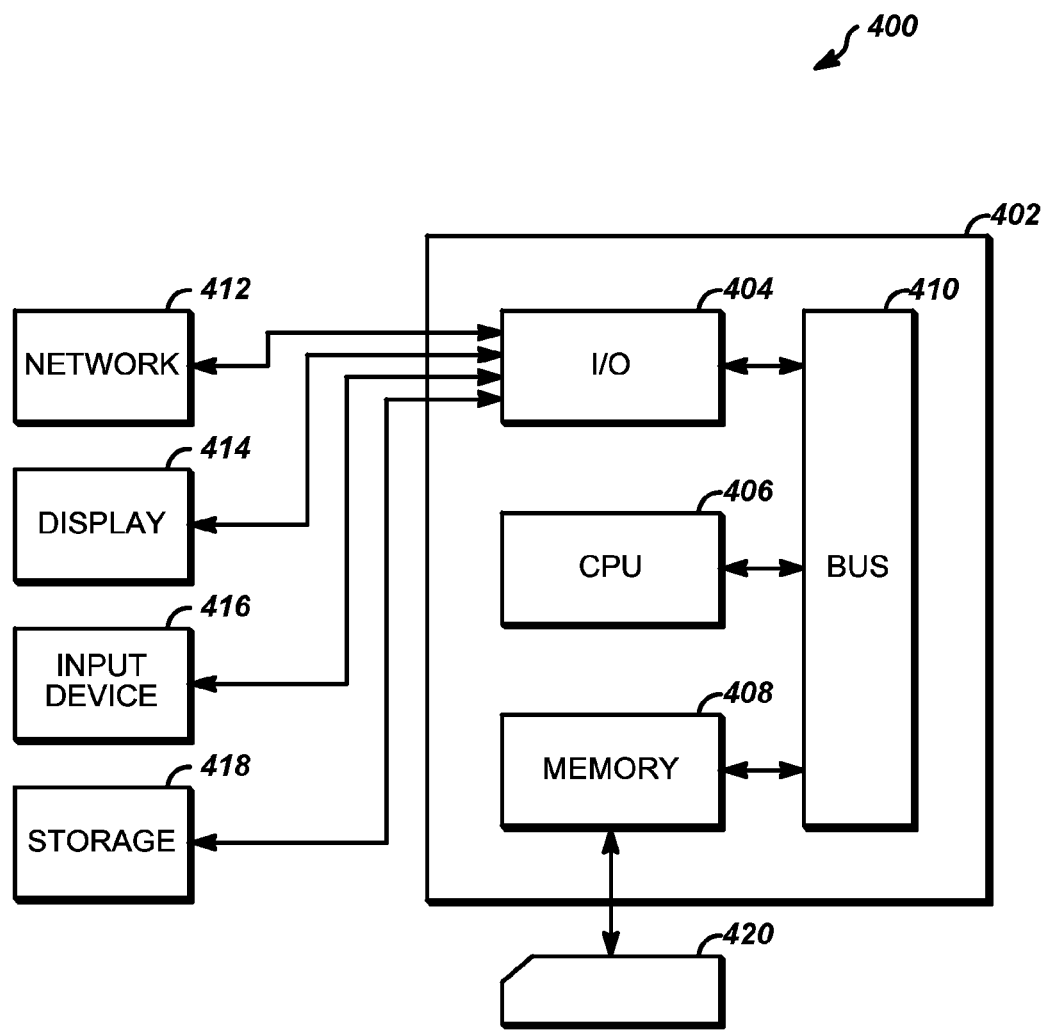
FIG. 4 depicts an example computing system or device.

The various features or aspects of the present disclosure may be implemented in or as or by exemplary computing system 400 illustrated in FIG. 4. In some embodiments, computing system 400 is a network device, such as a router, gateway, a firewall, or the like. In some embodiments, computing system 400 is a gateway device, such as a modem, or the like. In some embodiments, computing system 400 is a mobile device, such as a desktop computer, a laptop computer, a cellular phone, a tablet, or the like. In some embodiments, computing system 400 is a network interface "card." Notably, the aspects of process 100 may be implemented onto the same, or onto different computing systems. In some embodiments, computing system 400 has multiple network interfaces each having its own MAC address.

As shown in FIG. 4, the computing system 400 includes a computer motherboard 402 with bus 410 that connects I/O section 404, one or more central processing units (CPU) 406, and a memory section 408 together. Memory section 408 may have memory module 420 related to it. Memory module 420 may be, for example, a flash memory and/or a removable memory device. The I/O section 404 is connected to network interface 412, which receives and/or transmits network packets. I/O section 404 may be connected to display 414, input device 416, and/or storage unit 418. Memory section 408, memory module 420, and/or storage unit can store (e.g., tangibly embody) computer-readable medium that contain computer-executable instructions and/or data for performing any one of the above-described processes using CPU 406. The computer-executable instructions may be written, for example, in a general-purpose programming language (e.g., LISP, C) or some specialized application-specific language. Input device 416 may be a USB port supporting input from USB-compliant devices, such as a keyboard, a mouse, a memory stick, or the like. At least some values based on the results of the above-described processes can be saved into memory such as memory 408, memory module 420, and/or disk storage unit 418 for subsequent use.

Portions of process 100 (FIG. 1) also may be implemented into a processor by way of specifically arranged integrated circuits (e.g., application-specific integrated circuits). In some embodiments, the integrated circuit can be part of the main processor of a device, such as the main processor of a cellular phone. In some embodiments, the integrated circuit can be part of an auxiliary processor of a device, such as a processor that is connected to the motherboard of a laptop. The integrated circuits can contain computer-executable instructions and/or data for perform any one of the above-described processes. The computer-executable instructions may be written, for example, in a specialized application-specific (e.g., processor-specific) language.

Although only certain exemplary embodiments have been described in detail above, those skilled in the art will readily appreciate that many modifications are possible in the exemplary embodiments without materially departing from the novel teachings and advantages of this disclosure. Aspects of embodiments disclosed above can be combined in other combinations to form additional embodiments. All such modifications are intended to be included within the scope of this technology.

What is claimed is:

1. A method for accessing a network service of interest in a network system, the method comprising:
   by a network node:
      sending via a network gateway node a DNS (Domain Name Service) lookup request to a DNS service, wherein the DNS lookup request comprises a string that at least includes a MAC (Media Access Control) address of the network gateway node and a particular parameter both that are used by the DNS service to identify a number of distinct network addresses for the network node to access the network service of interest;
      receiving a DNS lookup response from the DNS service, wherein the DNS lookup response comprises an integer value that represents the number of distinct network addresses for the network node to access the network service of interest;
      randomly selecting a non-zero integer value that is less than or equal to the integer value;
      sending a second DNS lookup request to the DNS service via the network gateway node, wherein the second DNS lookup request comprises a second string that at least includes a MAC address of the network gateway node and the non-zero integer value both that are used by the DNS service to identify a particular network address for the network node to access the network service of interest; and
      accessing the network service of interest from another network node in the network system that is addressable by the received particular network address.

2. A method according to claim 1, wherein the string of the DNS lookup request comprises a DNS field indicator of address record type that is associated with the MAC address of the network gateway node.

3. A method according to claim 1, wherein the string of the DNS lookup request further comprises a MAC address of the network node.

4. A method according to claim 1, wherein the string of the DNS lookup request comprises a DNS field indicator of text record type that is associated with the parameter.

5. A method for resolving a request for access to a network service of interest in a network system, comprising:
   by a DNS service:
      receiving via a network gateway node a DNS (Domain Name Service) lookup request from a network node, wherein the DNS lookup request comprises a string that at least includes a MAC (Media Access Control) address of the network gateway node and a parameter that represents a call for a number of distinct network addresses available for the network node to access the network service of interest;

in response to receiving the DNS lookup request, identifying an integer value that represents the number of distinct network addresses available for the network node to access the network service of interest; and sending a DNS lookup response to the network gateway node, wherein the DNS lookup response comprises the integer value that represents the number of distinct network addresses available for the network node to access the network service of interest;

receiving via the network gateway node a second DNS lookup request from the network node, wherein the second DNS lookup request comprises a second string that at least includes a MAC address of the network gateway node and a non-zero integer value that is less than or equal to the integer value;

in response to receiving the second DNS lookup request, identifying a network address for the network node to access the network service of interest based upon the MAC address of the network gateway node and the non-zero integer value; and sending a second DNS lookup response to the network gateway node, wherein the second DNS lookup response comprises the network address for the network node to access the network service of interest.

6. A method according to claim 5, further comprising accessing a DNS record of address record type to identify the network address for the network node to access the network service of interest.

7. A method according to claim 5, wherein the string of the DNS lookup request further comprises a MAC address of the network node.

8. A method according to claim 5, further comprising accessing a DNS record of text record type to identify the integer value that represents the number of distinct network addresses available for the network node to access the network service of interest.

* * * * *